United States Patent
Heise

(10) Patent No.: US 8,800,588 B2
(45) Date of Patent: Aug. 12, 2014

(54) GLASS BULB THERMALLY-ACTIVATED PRESSURE RELIEF DEVICE, SAFETY INSPECTION METHOD, AND EQUIPMENT

(75) Inventor: Axel Heise, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 130 days.

(21) Appl. No.: 13/324,279

(22) Filed: Dec. 13, 2011

(65) Prior Publication Data

US 2013/0146147 A1   Jun. 13, 2013

(51) Int. Cl.
*F16K 17/38* (2006.01)

(52) U.S. Cl.
USPC .............. 137/80; 137/68.12; 137/73; 169/41; 169/42

(58) Field of Classification Search
CPC ..... F16K 17/003; F16K 17/14; F16K 17/383; F16K 13/04
USPC ............ 137/68.11, 68.12, 70, 73, 80; 169/41, 169/42
See application file for complete search history.

(56) References Cited

U.S. PATENT DOCUMENTS

| | | | | |
|---|---|---|---|---|
| 2,180,461 A | * | 11/1939 | Ellis | 169/41 |
| 2,671,461 A | | 3/1954 | Hebert | |
| 3,022,793 A | * | 2/1962 | Thorp, Jr. | 137/68.13 |
| 4,365,643 A | * | 12/1982 | Masclet et al. | 137/70 |
| 4,627,498 A | * | 12/1986 | Aalto et al. | 169/42 |
| 4,724,857 A | * | 2/1988 | Taylor | 137/67 |
| 4,836,443 A | | 6/1989 | Wolters et al. | |
| 5,435,333 A | * | 7/1995 | Duvall | 137/73 |
| 5,632,297 A | * | 5/1997 | Sciullo et al. | 137/73 |
| 5,788,212 A | | 8/1998 | Hackman et al. | |
| 5,967,238 A | * | 10/1999 | Pepi et al. | 169/37 |
| 6,058,961 A | * | 5/2000 | Taylor | 137/70 |
| 6,276,389 B1 | * | 8/2001 | Taylor | 137/68.11 |
| 6,286,536 B1 | * | 9/2001 | Kamp et al. | 137/68.13 |
| 6,341,616 B1 | * | 1/2002 | Taylor | 137/68.12 |
| 6,367,499 B1 | * | 4/2002 | Taku | 137/72 |
| 6,382,234 B1 | | 5/2002 | Birckhead et al. | |
| 6,814,097 B2 | * | 11/2004 | Girouard | 137/72 |
| 2003/0111110 A1 | * | 6/2003 | Taylor | 137/68.11 |
| 2005/0150548 A1 | * | 7/2005 | Kita et al. | 137/72 |
| 2008/0171248 A1 | | 7/2008 | Suess | |
| 2009/0293958 A1 | | 12/2009 | Weatherly et al. | |
| 2010/0307605 A1 | * | 12/2010 | Schmalfuss | 137/72 |
| 2012/0012190 A1 | * | 1/2012 | Barber | 137/68.11 |

FOREIGN PATENT DOCUMENTS

| | | |
|---|---|---|
| DE | 19911530 A1 | 9/2000 |
| DE | 102009046004 A1 | 4/2011 |
| EP | 1918621 A1 | 5/2008 |

* cited by examiner

*Primary Examiner* — John Rivell
*Assistant Examiner* — Minh Le
(74) *Attorney, Agent, or Firm* — Fraser Clemens Martin & Miller LLC; J. Douglas Miller

(57) ABSTRACT

A method and apparatus to periodically inspect and control piston movability are provided that can include using a contactless sensor system through a gas outlet port of a pressure relief device. By moving a stop, relative movement of the piston can be compared to the fixed body reflecting a movability or a blocking of the release piston. Inductive/magnetic or optical borescope sensors can detect piston movement through the gas outlet, for example. The activation function where the piston must move when activated can therefore be tested and maintained.

17 Claims, 1 Drawing Sheet

GLASS BULB THERMALLY-ACTIVATED PRESSURE RELIEF DEVICE, SAFETY INSPECTION METHOD, AND EQUIPMENT

FIELD OF THE INVENTION

The present technology relates to pressure relief devices, including thermally-activated pressure relief devices for pressure vessels.

BACKGROUND OF THE INVENTION

This section provides background information related to the present disclosure which is not necessarily prior art.

Various pressure relief devices are used to vent a pressurized substance, such as a gas, when activated under specified performance conditions. For example, such pressure relief devices can be used to vent the contents of a compressed hydrogen fuel container. The pressure relief device can be designed to achieve a desired flow capacity for protection of the hydrogen fuel container so the container is fully vented in a particular amount of time.

Certain high pressure containers can be classified into four types: a Type I vessel having an all-metal construction; a Type II having a metal lined construction with a fiberglass hoop wrap; a Type III having a metal lined construction with a composite full wrap; and a Type IV having a plastic lined construction with a composite full wrap. Such high pressure vessels for containing a compressed hydrogen gas should provide the necessary mechanical stability and integrity to prevent rupture or bursting of the pressure vessel from the hydrogen fuel pressure within. Pressure vessels for use in a vehicle can also be made using lightweight materials so they do not significantly affect the weight requirements of the vehicle. In some cases, the Type IV pressure vessel can be used for storing compressed hydrogen gas on a vehicle.

As described by Immel in U.S. Pat. No. 6,742,554, incorporated herein by reference in its entirety, the Type IV pressure vessel contemplated for storage of hydrogen gas is generally cylindrical in shape to provide the desired integrity, and includes an outer structural wall and an inner liner defining a container chamber therein. The combination of the outer wall and the liner provide the structural integrity, pressure containment, and gas tightness in a lightweight and cost effective manner.

Such pressure vessels can include an adapter that provides the inlet and outlet opening for the hydrogen gas contained therein. The adapter can house various valves, pressure regulators, piping connectors, excess flow limiter, etc. These components allow the pressure vessel to be filled with the compressed hydrogen gas and allow the compressed gas to be discharged from the pressure vessel at or near ambient pressure, or a higher pressure, and be sent to a user of the gas, such as a fuel cell power plant. The adapter can be made of steel, for example, to provide structural strength for storing the compressed hydrogen gas. A suitable adhesive, sealing ring, or the like can be employed to seal the liner to the adapter in a gas tight manner, and secure the adapter to the outer wall of the vessel.

Pressure vessels for use as fuel containers can have internal process faults or can be exposed to external elevated temperatures. Such conditions may act to increase the contained pressure and/or to degrade the structural materials, depending on the container type and construction. Incorporation of a pressure relief device provides a means to vent the fuel container under such conditions. In some pressure vessels, the pressure relief device can be located at the adapter or opening of the pressure vessel.

One type of pressure relief device is a Thermally-activated Pressure Relief Device (TPRD) that is activated by elevated temperature. The TPRD can be located in the same area or compartment as the fuel container or systems that are being protected so that it is exposed to the same environment. In this manner, the TPRD can react to the same conditions experienced by the fuel container. Shields and flow barriers, if any, can be positioned so they do not interfere with the response and functionality of the TPRD.

Various TPRDs exhibit limitations in certain applications. For example, one issue with glass bulb TPRD designs can be a loss of release piston movability during service-life. Corrosion and/or foreign material can block or freeze the release piston and hinder the activation function, where the piston is required to move and release the pressurized material. A loss of release piston movement can occur without any notice or indication. Moreover, once the TPRD is installed, there may be no way to check and ensure the release piston is not seized during the TPRD lifetime. In many cases, activation testing is not possible.

SUMMARY OF THE INVENTION

The present technology includes systems, processes, and articles of manufacture that allow performance inspection of a pressure relief valve.

In some embodiments, a pressure relief device is provided that comprises a body, a member, and a reactive component. The body comprises a channel and an outlet. The member is slidably disposed within the channel. The reactive component is disposed between an end of the member and a stop. The reactive component is sensitive to an environmental threshold that causes a conformation change in the reactive component thereby permitting the member to slide within the channel toward the stop and fluidly couple the channel and the outlet. The stop is configured to be moved between a first position and a second position thereby permitting the member to move relative to the body without fluidly coupling the channel and the outlet.

In other embodiments, a thermally-activated pressure relief device comprises a body comprising a channel and an outlet. A member is slidably disposed within the channel. A frangible component comprising a fluid is disposed between an end of the member and a stop. The frangible component is sensitive to a threshold temperature that causes the frangible component to break thereby permitting the member to slide within the channel toward the stop and fluidly couple the channel and the outlet. The stop is configured to be moved between a first position and a second position thereby permitting the member to move relative to the body without fluidly coupling the channel and the outlet.

In various embodiments, a method of testing a pressure relief device is provided that employs a pressure relief device as described herein. The method includes moving a stop of the pressure relief device between a first position and a second position and determining whether a member moves relative to a body of the pressure relief device.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF EXEMPLARY EMBODIMENTS OF THE INVENTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments where possible.

The present technology relates to safety inspection of a pressure relief valve and functionality check during the lifetime of the valve. Often a pressure vessel does not include a readily available power source and operates in environments where it is undesirable to utilize powered temperature sensors, such as a thermocouple acting on a solenoid driven pressure relief valve. Thus, in certain instances it can be desirable to provide a solid state pressure relief device of a mechanical nature, which reliably remains closed except when a temperature is experienced above a threshold temperature and/or a pressure is experienced above a threshold pressure, upon which the device opens to relieve pressure from the pressure vessel. For example, the pressure relief device can include a reactive component that changes conformation at the temperature and/or pressure desired. Upon conformation change, a member of the pressure relief device, such as a piston, is free to move to an open state that allows discharge of the pressure vessel contents.

One way to provide such a reactive component is to utilize a eutectic material that has a melting point at the threshold temperature. The eutectic material can be placed within a vent circuit of the pressure relief device. When a temperature above the melting point for the eutectic material is reached, the eutectic material changes conformation by melting and fluid is allowed to escape out of the device. Another way is to utilize a fluid-filled frangible component (e.g., glass bulb) where the fluid within the frangible component exhibits a pressure that ruptures the frangible component at the threshold temperature. Yet another way is to use a reactive component that deforms or breaks above a threshold pressure.

Figure 1:
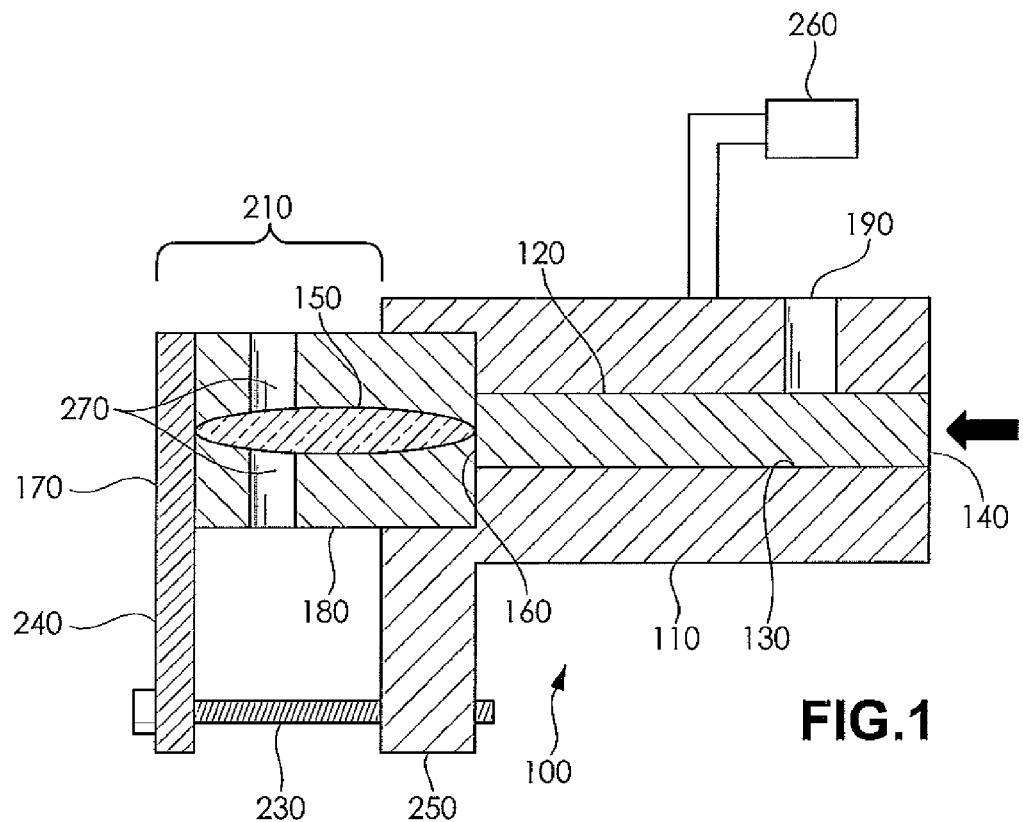
FIG. 1 illustrates a schematic cross-sectional view of an embodiment of a pressure relief device in a first position.

Referring now to FIG. 1, an embodiment of a pressure relief device 100 is depicted in a first position. The device 100 includes a body 110 and a member 120 (e.g., a piston) slidably disposed within a channel 130 of the body 110. For example, the channel 130 can traverse a length of the body 110 and the member 120 can occupy at least a portion of the channel 130. The member 120 can cooperate with the channel 130 to provide a fluid-tight seal within the channel 130. When the device 100 is coupled to a pressure vessel (not shown), one end 140 of the member 120 experiences a pressure based on contents of the pressure vessel, as indicated by a block arrow. For example, the member 120 can be coupled to another component (not shown) such as a spring that translates the pressure of the contents of the pressure vessel to the member 120. A reactive component 150 is disposed between another end 160 of the member 120 and a stop 170 where the reactive component 150 resists movement of the member 120 toward the stop 170. The reactive component 150 therefore prevents the member 120 from moving toward the stop 170 when the contents of the pressure vessel exert a pressure on the end 140 of the member 120. A protective cap 180 can be used to at least partially enclose and protect the reactive component 150 of the device 100. The protective cap 180 can include one or more openings 270 to allow the reactive component 150 to experience the local environment of the pressure relief device 100.

The reactive component 150 has sufficient structural integrity to resist the pressure of the contents of the pressure vessel translated through the member 120. However, the reactive component 150 is sensitive to an environmental threshold that causes the reactive component 150 to change conformation, allowing the member 120 to move relative to the stop 170. For example, the reactive component 150 can be sensitive to temperature, and when a threshold temperature is experienced, the result is that the reactive component 150 changes conformation so that it no longer resists movement of the member 120 toward the stop 170. For example, the member 120 can then move toward the stop 170 due to the pressure of the vessel contents exerted on the member 120. This allows the moving member 120 and the end 140 to expose an outlet 190 to fluid communication with the channel 130 so that contents of the pressure vessel can vent through the outlet 190. Similarly, when the reactive component 150 is sensitive to pressure and experiences a threshold pressure that results in the reactive component 150 changing conformation, the reactive component 150 no longer resists movement of the member 120 toward the stop 170 so that the member 120 can move toward the stop 170 and expose the outlet 190. It should be noted that in some embodiments the reactive component 150 can be sensitive to both a threshold temperature and a threshold pressure or other environmental thresholds.

Figure 2:
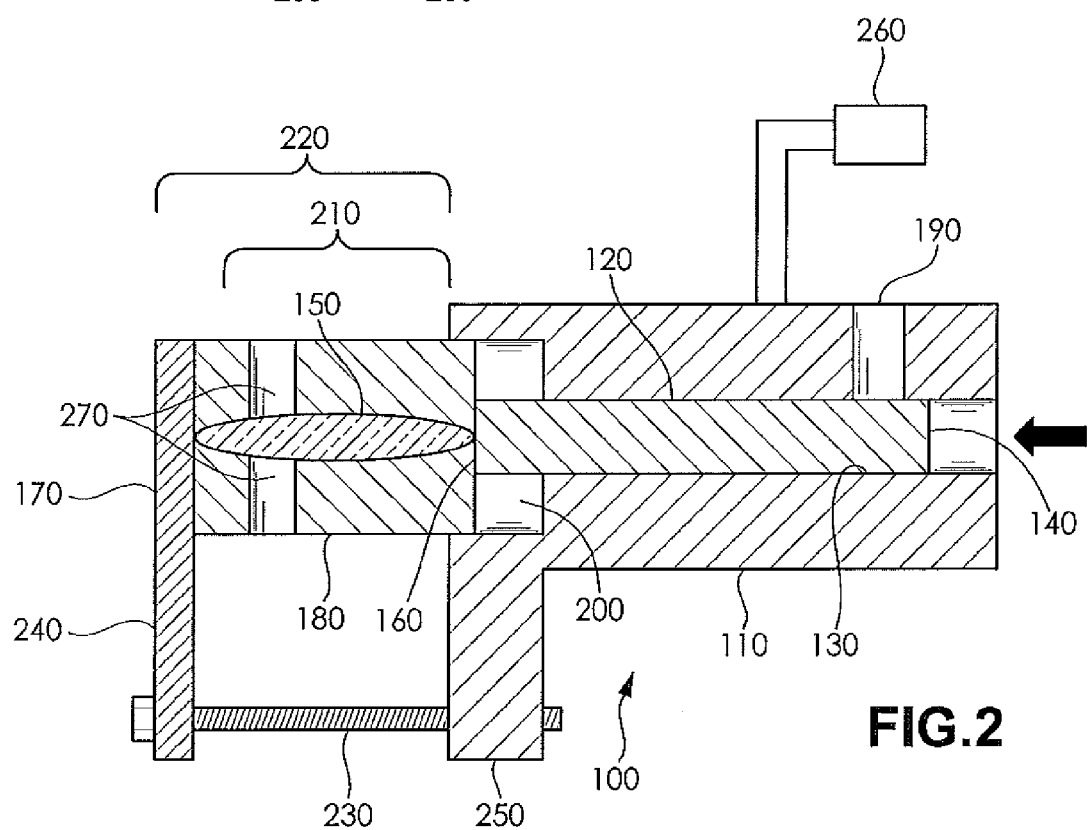
FIG. 2 illustrates a schematic cross-sectional view of the embodiment of the pressure relief device of FIG. 1 in a second position.

Referring now to FIG. 2, an embodiment of the pressure relief device 100 in a second position is depicted. In the second position, the member 120, the reactive component 150, and the stop 170 can be moved together relative to the body 110 of the device 100 in a direction that would eventually expose the outlet 190. However, the movement is not enough to expose the outlet 190 to allow the contents of the pressure vessel to vent through the outlet 190. That is, the member 120 can slide a distance through the channel 130 to ensure the member 120 is not frozen or fixed relative to the channel 130 in the body 110. The member 120, the reactive component 150, and the stop 170 remain in position relative to each other and the optional protective cap 180 can remain in position relative to the member 120, the reactive component 150, and the stop 170. For example, movement of the member 120, the reactive component 150, the stop 170, and the protective cap 180 to the second position can form a gap 200 between the protective cap 180 and the body 110.

Changing the pressure relief device 100 from the first position in FIG. 1 to the second position in FIG. 2, or vice versa, provides a means to test whether the member 120 is slidable relative to the channel 130 and can ensure the device 100 is not frozen and inoperable due to corrosion and/or foreign material binding the member 120 relative to the channel 130. In some embodiments, moving the device 100 between the positions shown in FIGS. 1 and 2 can be done to improve movement of the member 120 within the channel 130 where the member 120 may be partially stuck relative to the channel 130.

The pressure relief device 100 can be switched between the first position in FIG. 1 and the second position in FIG. 2 by changing the position of the stop 170 relative to the body 110. For example, in the first position shown in FIG. 1 the stop 170 can be at a first distance 210 from the body 110 and in the second position shown in FIG. 2, the stop 170 can be at a second distance 220 from the body 110. As shown, the second distance 220 at the second position does not expose the outlet 190 to the channel 130 as the member 120 moves. Moving the stop 170, which in turn can concomitantly move the reactive component 150, the member 120, and optional protective cap 180, can assess whether the member 120 is still slidably disposed within the channel 130 of the body 110. In moving the device 100 from the first position of FIG. 1 to the second position of FIG. 2, the pressure on the end 140 of the member 120 (indicated by the block arrow) provided by the contents of the pressure vessel can ensure that the member 120 and the reactive component 150 move with the stop 170. In some instances, if the stop 170 is moved from the first position to the second position and the member 120 does not move similarly, the member 120 may be stuck or frozen within the channel 130, indicating operation of the pressure relief device 100 may be compromised.

Various means can be used to move the stop 170 relative to the body 110 of the device 100. An adjustable retention system can retain the position of the stop 170 relative to the body 110. In some embodiments, the adjustable retention system can resist and can overcome the pressure applied to the end 140 of the member 120 from the contents of the pressure vessel, where the pressure is translated through the member 120 to the reactive component 150 and to the stop 170. For example, the adjustable retention system can include a screw 230 coupling a portion 240 of the stop 170 and threaded portion 250 of the body 110 and having travel to advance/retract the stop 170 relative to the body 110. Other means used for translating one object relative to another object can be used retain the stop 170 in the first/second positions relative to the body 110; e.g., a ratcheting lever with adjustable and lockable positions (not shown).

In some embodiments, the pressure relief device 100 can include a sensing means to sense whether the member 120 moves relative to the body 110. For example, the sensing means can include an optical or inductive sensor 260 coupled to the body 110 that is configured to detect relative movement between the member 120 and the body 110. In various embodiments, the sensing means can be positioned to detect movement of the member 120 through the outlet 190, as shown. Or, in other embodiments, another aperture (not shown) in the body 110 of the device 100 can be used for sensing movement of the member 120 through the channel 130 in the body 110. In various embodiments, the member 120 may be viewed through the outlet 190 where the member 120 can be marked or indexed to indicate whether the member 120 has moved relative to the body 110 when the device 100 is switched between the first and second positions as shown in FIGS. 1 and 2.

The present technology provides several benefits. These include improvements by providing pressure relief devices with testing functionality. The ability to inspect operation of the pressure relief device can identify devices that require repair or replacement. Certain applications employing pressure vessels may need to meet codes, standards, or regulations pertaining to pressure vessel safety that require relief valve testing.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A pressure relief device comprising: a body comprising a channel and an outlet; a member slidably disposed within the channel; and
   a protective cap at least partially enclosing a reactive component disposed between a terminal end of the member and a stop, the terminal end of the member abutting the protective cap, wherein:
   the reactive component is sensitive to an environmental threshold of an environment that causes a conformation change in the reactive component thereby permitting the member to slide within the channel toward the stop and fluidly couple the channel and the outlet, wherein the reactive component is directly exposed to the environment to which the reactive component is sensitive; and
   wherein the stop is configured to be moved between a first position and a second position thereby permitting the member and the protective cap to move relative to the body without fluidly coupling the channel and the outlet when the environmental threshold is not reached.

2. The pressure relief device of claim 1, wherein the environmental threshold comprises a threshold temperature.

3. The pressure relief device of claim 1, wherein the environmental threshold comprises a threshold pressure.

4. The pressure relief device of claim 1, wherein the reactive component comprises a eutectic material.

5. The pressure relief device of claim 1, wherein the reactive component comprises a frangible component comprising a fluid.

6. The pressure relief device of claim 1, further comprising a retention means for positioning the stop at the first position and the second position.

7. The pressure relief device of claim 1, further comprising a sensing means configured to detect relative movement between the member and the body when the stop is moved between the first position and the second position.

8. A thermally-activated pressure relief device comprising:
   a body comprising a channel and an outlet;
   a member slidably disposed within the channel; and
   a protective cap at least partially enclosing a frangible component comprising a fluid disposed between a terminal end of the member and a stop, the terminal end of the member abutting the protective cap, wherein:
   the frangible component is sensitive to a threshold temperature encountered by the frangible component that causes the frangible component to break thereby permitting the member to slide within the channel toward the stop and fluidly couple the channel and the outlet; and
   wherein the stop is configured to be moved between a first position and a second position thereby permitting the member and the protective cap to move relative to the body without fluidly coupling the channel and the outlet when the threshold temperature is not reached.

9. The pressure relief device of claim 8, further comprising a retention means for retaining the stop at the first position and the second position.

10. The pressure relief device of claim 8, further comprising a sensing means configured to detect movement between the member and the body when the stop is moved between the first position and the second position.

11. A method of testing a pressure relief device comprising:
   providing a pressure relief device according to claim 1;
   moving the stop between the first position and the second position; and
   determining whether the member moves relative to the body.

12. The method of claim 11, wherein the environmental threshold comprises a threshold temperature.

13. The method of claim 11, wherein the environmental threshold comprises a threshold pressure.

14. The method of claim 11, wherein the reactive component comprises a eutectic material.

15. The method of claim 11, wherein the reactive component comprises a frangible component comprising a fluid.

16. The method of claim 11, further comprising a retention means for positioning the stop at the first position and the second position.

17. The method of claim 11, further comprising a sensing means configured to detect relative movement between the member and the body when the stop is moved between the first position and the second position.

* * * * *